(12) United States Patent
Kim et al.

(10) Patent No.: US 10,484,946 B2
(45) Date of Patent: Nov. 19, 2019

(54) METHOD OF REPORTING MEASUREMENT INFORMATION IN PACKET BASED ON CELLULAR SYSTEM

(75) Inventors: Jae-Heung Kim, Daejeon (KR);
Jung-Im Kim, Daejeon (KR);
Kyoung-Seok Lee, Daejeon (KR);
Byung-Han Ryu, Daejon (KR);
Seung-Chan Bang, Daejon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 12/522,732

(22) PCT Filed: Jan. 3, 2008

(86) PCT No.: PCT/KR2008/000033
§ 371 (c)(1),
(2), (4) Date: Jul. 10, 2009

(87) PCT Pub. No.: WO2008/084938
PCT Pub. Date: Jul. 17, 2008

(65) Prior Publication Data
US 2010/0014429 A1    Jan. 21, 2010

(30) Foreign Application Priority Data
Jan. 12, 2007    (KR) .................... 10-2007-0003890

(51) Int. Cl.
*H04L 12/26*    (2006.01)
*H04W 52/02*    (2009.01)
(Continued)

(52) U.S. Cl.
CPC ...... *H04W 52/0216* (2013.01); *H04B 17/309* (2015.01); *H04W 24/00* (2013.01);
(Continued)

(58) Field of Classification Search
CPC . H04W 24/00; H04W 52/0216; H04W 36/30; H04W 52/0229; H04W 36/0088;
(Continued)

(56) References Cited

U.S. PATENT DOCUMENTS 6,445,917 B1 * 9/2002 Bark ...................... H04W 24/00
370/331
6,611,688 B1 * 8/2003 Raith ........................ 455/456.1
(Continued)

FOREIGN PATENT DOCUMENTS

WO    WO-06/083134 A1    8/2006

*Primary Examiner* — Vinncelas Louis (57) ABSTRACT

Disclosed is a method for efficiently reporting measurement information required for handover in active-state terminals executing a power-saving operation in a packet-based communication system. The method includes the steps of: (a) receiving a discontinuous reception (DRX) period, a discontinuous transmission (DTX) period, and a measurement information report parameter that are decided by a base station; and (b) measuring channel quality according to a measurement information report period included in the measurement information report parameter, and reporting measurement information formed based on the measurement information report parameter by using radio resources allocated by the base station.

20 Claims, 6 Drawing Sheets

(51) Int. Cl.
  *H04W 24/00* (2009.01)
  *H04B 17/309* (2015.01)
  *H04W 36/00* (2009.01)
  *H04W 72/04* (2009.01)
  *H04W 88/08* (2009.01)
  *H04W 76/28* (2018.01)

(52) U.S. Cl.
  CPC ........ *H04W 36/00* (2013.01); *H04W 72/0413* (2013.01); *H04W 76/28* (2018.02); *H04W 88/08* (2013.01); *Y02D 70/1262* (2018.01); *Y02D 70/24* (2018.01); *Y02D 70/25* (2018.01)

(58) Field of Classification Search
  CPC ... H04W 52/283; H04W 48/12; H04B 17/309
  USPC ....... 370/241, 311, 329, 331, 347, 235, 312; 455/67.11, 434, 442, 574, 456.1, 69
  See application file for complete search history.

(56) References Cited

U.S. PATENT DOCUMENTS

| | | | |
|---|---|---|---|
| 6,768,715 B2 * | 7/2004 | Hsu et al. | 370/229 |
| 6,845,246 B1 * | 1/2005 | Steer | H04W 52/283 370/318 |
| 7,346,349 B2 * | 3/2008 | Numminen et al. | 455/434 |
| 8,553,585 B2 * | 10/2013 | Kim | H04W 36/0088 370/255 |
| 8,818,321 B2 * | 8/2014 | Dalsgaard et al. | 455/343.2 |
| 2002/0114280 A1 * | 8/2002 | Yi et al. | 370/235 |
| 2003/0125088 A1 * | 7/2003 | Brigant | H04W 48/12 455/561 |
| 2005/0190712 A1 * | 9/2005 | Lee et al. | 370/312 |
| 2005/0191965 A1 | 9/2005 | Yu et al. | |
| 2005/0201296 A1 | 9/2005 | Vannithamby et al. | |
| 2006/0281463 A1 * | 12/2006 | Yang | 455/442 |
| 2007/0047493 A1 * | 3/2007 | Park et al. | 370/331 |
| 2007/0082619 A1 * | 4/2007 | Zhang et al. | 455/69 |
| 2007/0129017 A1 * | 6/2007 | Dalsgaard et al. | 455/67.11 |
| 2007/0291728 A1 * | 12/2007 | Dalsgaard et al. | 370/347 |
| 2008/0101268 A1 * | 5/2008 | Sammour et al. | 370/311 |
| 2008/0132230 A1 * | 6/2008 | Marinier et al. | 455/434 |
| 2008/0167089 A1 * | 7/2008 | Suzuki et al. | 455/574 |
| 2008/0268845 A1 * | 10/2008 | Wu | H04W 76/048 455/436 |
| 2008/0293426 A1 * | 11/2008 | Kim et al. | 455/450 |
| 2009/0010219 A1 * | 1/2009 | Lee et al. | 370/329 |

\* cited by examiner

METHOD OF REPORTING MEASUREMENT INFORMATION IN PACKET BASED ON CELLULAR SYSTEM

RELATED APPLICATIONS

This application is a 35 U.S.C. § 371 national stage filing of PCT Application No. PCT/KR2008/000033 filed on Jan. 3, 2008, which claims priority to, and the benefit of, Korean Patent Application No. 10-2007-0003890 filed on Jan. 12, 2007. The contents of the aforementioned applications are hereby incorporated by reference.

TECHNICAL FIELD

The present invention relates to a measurement information reporting method in a packet-based communication system; and, more particularly, to a method for efficiently reporting measurement information required for an active-state terminal executing a power-saving operation to perform handover in a packet-based communication system.

BACKGROUND ART

When terminals perform call setup to provide a service in a Wideband Code Division Multiple Access (WCDMA) circuit-based cellular system, the terminals transit into an active state in which they maintain radio resource control (RRC) connection. The terminals in active state can transmit control information or packets through a configured dedicated channel whenever they require the transmission of control information/packet data according to buffer status or wireless channel environment. Therefore, the terminals report measurement information on a serving cell and neighbor cells at a measurement information report period that is set up in advance in order to execute handover. The transmission channel between a terminal and a base station is maintained until the base station and the terminal terminate the service and the terminal releases radio resources used in the service to transit into an idle state. Although the terminal is in the idle state, a network collects measurement information from the terminal at the measurement information report period to perform network management on the basis of a cell to which the terminal belongs. Also, the terminal may report measurement information to the network when the terminal decides that handover triggering is needed.

In a packet-based cellular system, however, a transmission channel for transmitting packet information does not provided dedicatedly to a corresponding terminal until the end of a packet service between the terminal and a base station, even though the terminal is in the active state for the service. In other words, although a logical channel for transmitting packet data continues to exist, radio resources, which are physical channels, are shared by a plurality of terminals under the coverage of a base station. Control operation related to radio resource allocation is carried out by the base station. Specifically, an RRC function and a scheduler of the base station take charge of allocating and scheduling radio resources.

For example, a 3rd-Generation Partnership Project (3GPP) Long Term Evolution (LTE) system is a packet-based system providing services. When RRC connection is set up to provide a packet service between a base station and a terminal in a packet-based cellular system, the terminal transits into the active state. When the service is terminated or no packet data to be transmitted are generated for more than a predetermined time, the terminal may transit into the idle state under the control of the base station.

When the terminal is in the active state, the base station allocates radio resources for transmitting packet data to the terminal according to quality of service (QoS) and burst characteristics. The radio resources are allocated semi-statically, persistently, or dynamically according to scheduling performance in an RRC layer and a medium access control (MAC) layer of the base station.

Generally, the QoS and such burst characteristics of the packet service as packet data size and packet generation frequency are different according to whether the packet service is a real-time service or non-real time service. Also, allocation of radio resources for providing a service is affected as well. This factor is called activity level or activity factor. Ultimately, the scheduler of a base station allocates radio resources for transmitting packet data according to the activity factor.

Meanwhile, when a terminal does not transmit or receive packets in a packet-based cellular system, the terminal needs to execute an operation for saving power. An active-state terminal as well executes a power-saving operation in a packet-based cellular system during a discontinuous reception (DRX) period or a discontinuous transmission (DTX) period to save power consumption. Basically, a terminal executes the power-saving operation according to DRX/DTX period that are set up between the terminal and a base station. To take an example, an active-state terminal remains in a sleep mode for the predetermined DRX/DTX period, and wakes up at the end of the periods to decode control signal blocks transmitted from the base station.

Also, in order to support handover, which is one of the most important functions of a cellular system, the terminal measures quality information not only of a serving cell that is currently on service but also neighbor cells as well and reports the quality information to the base station.

The active-state terminal should execute the power-saving operation in a duration when no data burst out according to the predetermined discontinuous DRX/DTX period in the packet-based cellular system, while transmitting/receiving packet data through radio resources allocated by the scheduler of the base station. Then, the terminal should report the measured quality information of the serving cell and neighbor cells for handover.

Figure 1:
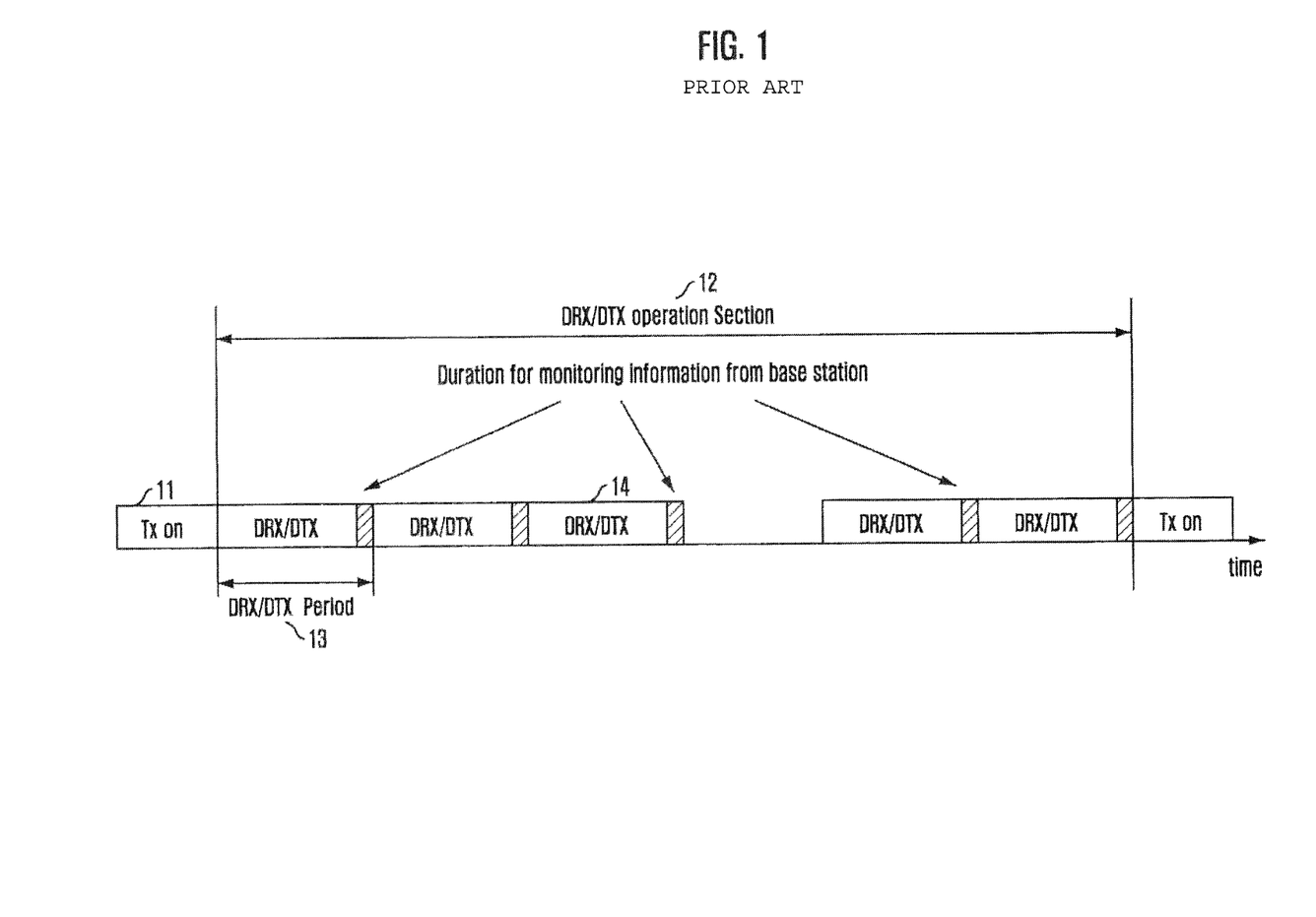
FIG. 1 exemplarily shows an operation of an active-state that is generally performed according to DRX/DTX periods.

FIG. 1 exemplarily shows an operation of an active-state receiving a packet service that is generally performed according to discontinuous DRX/DTX period.

An active-state terminal receiving a service in a packet-based cellular system exchanges packet data with a base station through radio resources addressed by a scheduler of the base station according to scheduling information. The terminal executes a power-saving operation based on DRX/ and/or DTX parameters in a DRX/DTX operation section 12, which is not a packet data exchange section 11, to save power consumed in the terminal. The DRX/DTX parameters basically include DRX/DTX periods 13. The DRX/DTX periods 13 include DRX/DTX duration 14 and monitoring duration 15. In the DRX/DTX duration 14, the terminal does not transmit or receive packets to or from the base station to reduce its power consumption. In the monitoring duration 15, the terminal monitors information transmitted from the base station. The information involves information directing the terminal to receive downlink packets such as paging information.

In order to transmit packet data from the base station to the terminal in the DRX/DTX operation section, the base station transmits to the terminal information directing the terminal to receive data in the monitoring duration. When the terminal receives the data and acknowledges to the base station, the base station transmits downlink packet data.

Also, in order to transmit uplink packet information from the terminal to the base station, the terminal executes one of the following processes after DRX/DTX operation ends. At first, after the terminal ends the DRX/DTX operation, the terminal tries a random access to the base station to receive radio resources allocated thereto. Secondly, the base station transmits scheduling information to the terminal in a duration where the terminal is awake, which is the monitoring duration 15, following the ends of a DRX/DTX period and allocates uplink radio resources. Thirdly, uplink radio resources are allocated in the duration when the terminal is awake according to a protocol predetermined between the base station and the terminal.

Meanwhile, handover is one of the most important functions of a cellular communication system. Active-state terminals should be able to transmit measurement information on a serving cell and neighbor cell periodically or if necessary in order to smoothly perform handover. In the packet data exchange section 11 where packet data are exchanged between the base station and the terminal, the terminal can transmit the measurement information to the base station through one of the following three methods. A first one is that the base station allocates additional uplink radio resources for the report of the measurement information. A second one is that the terminal transmits the measurement information along with packet data by using the allocated uplink radio resources. The third one is that the terminal requests the base station to allocate radio resources to be used for reporting the measurement information through the allocated uplink radio resources.

As described above, since an active-state terminal, too, operates according to DRX/DTX periods to save power in a packet-based cellular system, it is required to develop a method for the terminal performing power-saving operation to report measurement information on a serving cell and neighbor cells for the sake of handover.

DISCLOSURE

Technical Problem

An embodiment of the present invention, which is devised to overcome the shortcomings of related art, is directed to providing a measurement information reporting method for efficiently reporting measurement information on a serving cell and neighbor cells which is required for an active-state terminal executing power-saving operation to perform handover in a packet-based communication system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for reporting measurement information about a serving base station and neighbor base stations in a packet-based communication system, the method which includes the steps of: (a) receiving a discontinuous reception (DRX) period, a discontinuous transmission (DTX) period, and a measurement information report parameter that are decided by a base station; and (b) measuring channel quality according to a measurement information report period included in the measurement information report parameter, and reporting measurement information formed based on the measurement information report parameter by using radio resources allocated by the base station.

In accordance with another aspect of the present invention, there is provided a method for reporting measurement information about a serving base station and neighbor base stations in a packet-based communication system, the method which includes the steps of: (a) deciding a discontinuous reception (DRX) period, a discontinuous transmission (DTX) period, and a measurement information report parameter; (b) transmitting the DRX period, the DTX period, and the measurement information report parameter decided above to a terminal; and (c) measuring channel quality according to a measurement information report period included in the measurement information report parameter, and receiving measurement information formed based on the measurement information report parameter by using allocated radio resources.

Advantageous Effects

The measurement information reporting method of the present invention described above can measure and report information on base stations of a serving cell and neighbor cells based on measurement information report parameters that are set up by the respective base stations to support handover at active-state terminals executing a power-saving operation in a packet-based communication system.

BEST MODE FOR THE INVENTION

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Hereinafter, specific embodiments of the present invention will be described with reference to the accompanying drawings.

Discontinuous reception (DRX) and discontinuous transmission (DTX) periods may be different according to quality of service (QoS) and attributes of a packet service, capability of a terminal, and aforementioned activity factor. For example, the DRX and DTX periods may be 10 milliseconds or so in case of a real-time service, and it may be even 0 milliseconds in an extreme case. The DRX and DTX periods may range up to about 1 second and the maximum time defined by a system, when a service is not sensitive to time delay such as a non-real time service. Therefore, the terminal executing the power-saving operation should report measurement information at a period related to the DRX and DTX periods to efficiently report the measurement information. Otherwise, the report of measurement information may collide with the power-saving operation.

Figure 2:
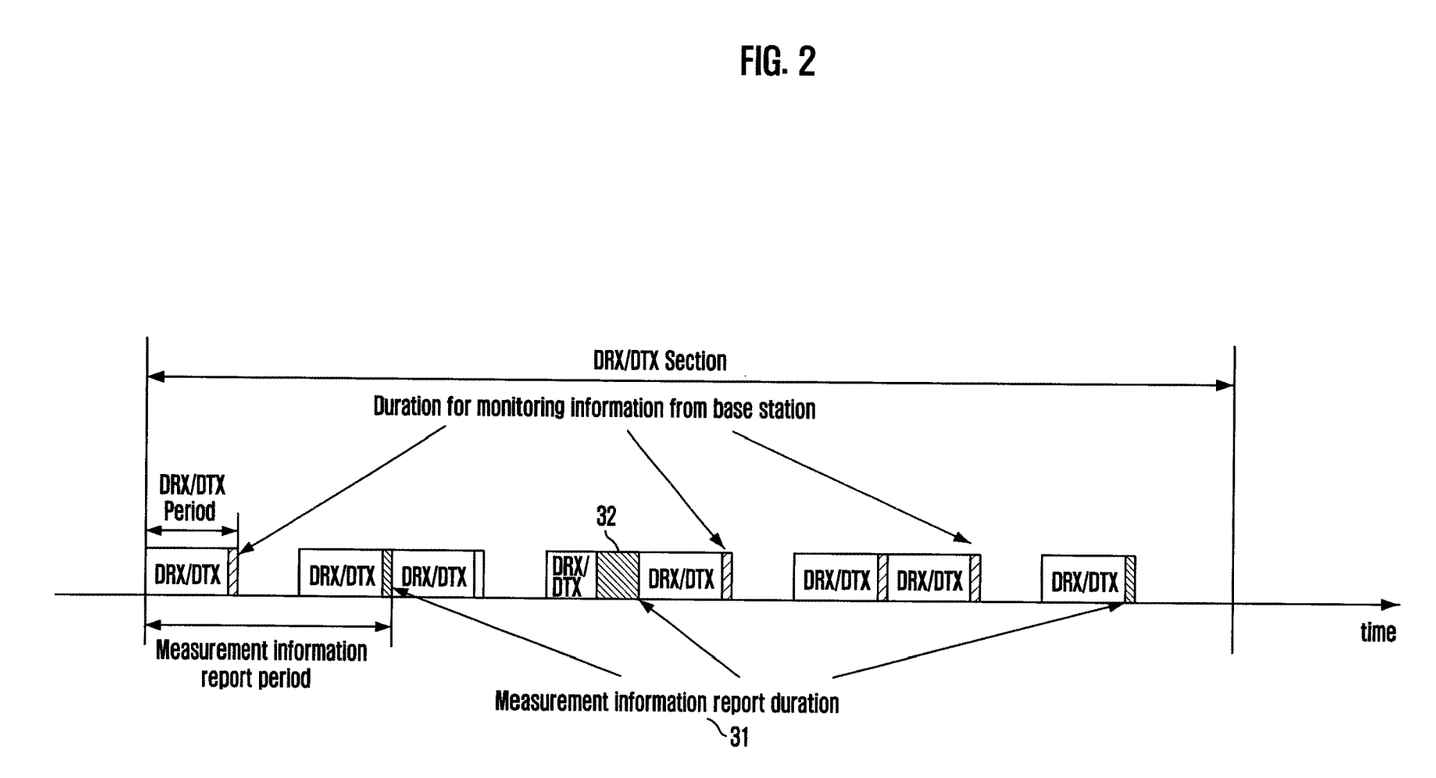
FIG. 2 illustrates a typical measurement information report period according to a DRX/DTX operation period.

FIG. 2 illustrates an example where a typical terminal executing a power-saving operation reports measurement information based on a protocol predetermined between a base station and the terminal.

The base station sets up a measurement information report period as well when it sets up DRX and DTX periods for power-saving operation. Also, the base station sets up the measurement information report period according to loading status of the base station, a network environment, e.g., wireless channel environment, and an activity factor of the terminal acquired based on a provided service.

It is efficient to set up the measurement information report period to be multiple numbers of the DRX and DTX periods. Consequently, the minimum unit of the measurement information report period is the DRX and DTX periods of a corresponding terminal. The base station can change the measurement information report period at a certain time moment. The terminal may perform measurement for a long time duration 32 to report measurement information in detail in the measurement information report duration 31. However, the measurement should be carried out while the terminal maintains the DRX/DTX periods for power-saving operation. In other words, the measurement operation and the DRX/DTX periods cannot be independent from each other in the terminal, and the terminal should measure quality information of a serving cell and neighbor cells even in a sleep duration of the DRX operation. The monitoring duration for monitoring downlink control information from the base station follows the predetermined DRX/DTX periods.

Uplink physical layers should be synchronized to maintain orthogonality among terminals during uplink data transmission in a packet-based cellular system based on Orthogonal Frequency Division Multiple Access (OFDMA). Therefore, not only terminals transmitting/receiving packets but also terminals executing the power-saving operation should have their physical layers synchronized at the moment when they transmit uplink packets.

Terminals executing the power-saving operation according to DRX/DTX periods may maintain uplink physical layer synchronization even in the middle of the power-saving operation according to an activity factor of the provided service, or they may not maintain physical layer synchronization in a predetermined time after they transit into DRX/DTX operation mode. Particularly, they need to maintain uplink physical layer synchronization in case of a real-time service where radio resources are periodically allocated according to the DRX/DTX periods.

Figure 3:
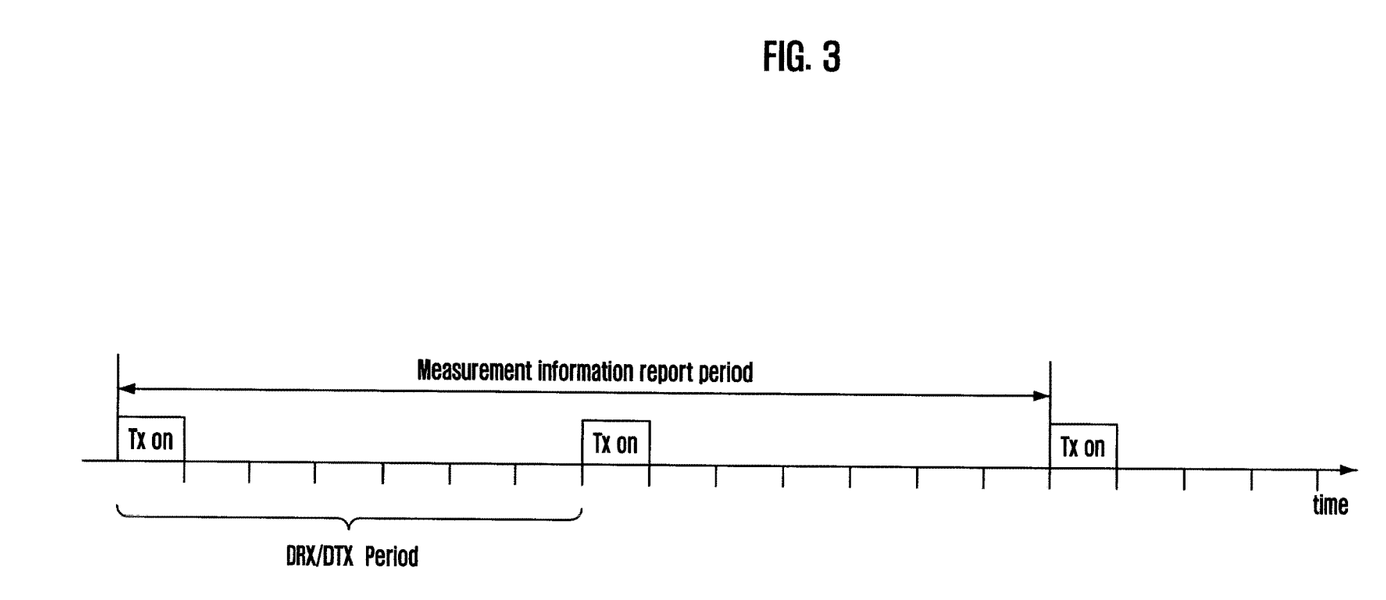
FIG. 3 illustrates a DRX/DTX period for a real-time service and a measurement information report period.

FIG. 3 illustrates an example of operation according to DRX/DTX periods. In case of a real-time service, a base station and a terminal periodically allocates radio resources for packet transmission for each DRX/DTX period. In this case, the terminal can report measurement information through radio resources allocated thereto for each DRX/DTX period according to a pre-established measurement information report parameter. Also, the base station can direct the terminal to report measurement information along with the transmission of packet data. The terminal, too, can report measurement information through the uplink radio resources allocated thereto or request the base station to allocate uplink radio resources for the transmission of the measurement information, although the measurement information report period has yet come.

The measurement information report parameter may include a measurement information report period, a measurement information report object, and a measurement information report content. In addition, the measurement information report parameter may further include information defining measurement information report requirements for a case when an event occurs, which will be called an event-driven measurement information report requirements.

The measurement information report period is set up to be a multiple number of the DRX/DTX periods. The measurement information report object includes the range of neighbor cells to be measured. Generally, the base station broadcasts a list of neighbor base stations, or neighbor cells, by using system information. The range of neighbor cells to be measured is decided in the list of neighbor cells to be measured.

Meanwhile, when the system information does not include the neighbor cell information, the terminal requests the base station through an additional control signaling and receives the neighbor cell information, or it checks neighbor cells with its cell search function and measures information about the neighbor cells.

The measurement information report content may include radio channel quality report values of the serving cell and neighbor cells, a measurement section value, and the inference level from the neighbor cells. The radio channel quality report value includes a section average value and a standard deviation value of channel quality for a system band and a section average value and a standard deviation value of channel quality for a frequency group in a system band. The measurement section value denotes time taken for the measurement.

Meanwhile, the information on the event-driven measurement information report requirements denotes requirement information for reporting measurement information with no regard to the measurement information report period and the DRX/DTX operation under the following specific conditions. The specific conditions may include a first case where the quality of the serving cell is deteriorated and thus handover should be requested, a second case where there is a target cell superior to the serving cell by a predetermined level and thus handover should be requested, and a third case where the quality of the provided service does not satisfy requirements.

The control and parameter setup for reporting the measurement information are established through discussion between the base station and the terminal. Of course, the measurement information report parameter may be changed. The change in the measurement information report parameter is carried out through the following two methods.

First, the measurement information report parameter can be changed by exchanging control information. To be specific, the base station decides to change the measurement information report parameter based on measurement information report information, and change the measurement information report parameter by exchanging control information with the terminal.

Secondly, the terminal can change the measurement information report parameter without exchanging control information. To be specific, the base station informs the terminal of a set of available measurement information report parameters, and the terminal changes the measurement information report parameter into a proper parameter among the parameters of the set.

Herein, the measurement information report parameter is changed by exchanging control information. Although the measurement information report parameter can be set up properly by exchanging additional information between the base station and the terminal, signaling overhead caused by the transmission of control information exists. Differently from the method, the method of changing the measurement information report parameter without exchanging control information does not cause signaling overhead but it may report measurement information that does not suitable for an event of the base station. This is because the base station sets up a set of available measurement information report parameters in advance and the terminal changes the measurement information report parameter into a proper parameter among the parameters of the set according to the event without exchanging control information.

Likewise, a change in the measurement information report period should be carried out through definite signaling with the base station when the measurement information report parameter is exchanged without exchanging control information. A change in other parameters may be independently performed by the terminal.

Hereinafter, examples of changeable measurement information parameters will be described. A measurement information report parameter is changed by selecting one among a plurality of measurement information report types according to the standard deviation of a measurement result. For example, when the standard deviation of a measurement result performed for a predetermined time period falls in a predetermined range, a type of a measurement information report message which forms a measurement information report parameter by excluding some of measurement information report objects or reducing a measurement information report content so that report load is decreased. However, when the standard deviation of the measurement result performed for a predetermined time period is out of the predetermined range, a type of a measurement information report message which forms a measurement information report parameter by adding a measurement information report object or increasing the measurement information report content so that report load is increased. The following Table 1 shows measurement information report objects and measurement information report contents according to the types of measurement information report messages.

TABLE 1

| Type of MI report message | MI report object | MI report content |
|---|---|---|
| 1 | Serving cell | Section average value and standard deviation of channel quality for system band; and section average value and standard deviation of channel quality for a frequency group in system band |
| | All cells listed on neighbor cell list | Section average value and standard deviation of channel quality for system band |
| 2 | Serving cell | Section average value and standard deviation of channel quality for system band |
| | All cells listed on neighbor cell list | Section average value of channel quality for system band |
| 3 | All cells listed on neighbor cell list | Section average value of channel quality for system band |
| 4 | Serving cell | Section average value and standard deviation of channel quality for system band |
| | Some cells listed on neighbor cell list (2-tiered) | Section average value and standard deviation of channel quality for system band |
| 5 | Some cells listed on neighbor cell list (2-tiered) | Section average value and standard deviation of channel quality for system band |
| 6 | Serving cell | Section average value and standard deviation of channel quality for system band |
| | Some cells listed on neighbor cell list (1-tiered) | Section average value and standard deviation of channel quality for system band |
| 7 | Some cells listed on neighbor cell list (1-tiered) | Section average value and standard deviation of channel quality for system band |
| 8 | Serving cell | Section average value and standard deviation of channel quality for system band; and section average value and standard deviation of channel quality for a frequency group in system band |
| 9 | Serving cell | Section average value and standard deviation of channel quality for system band |

*MI denotes measurement information.

Figure 4:
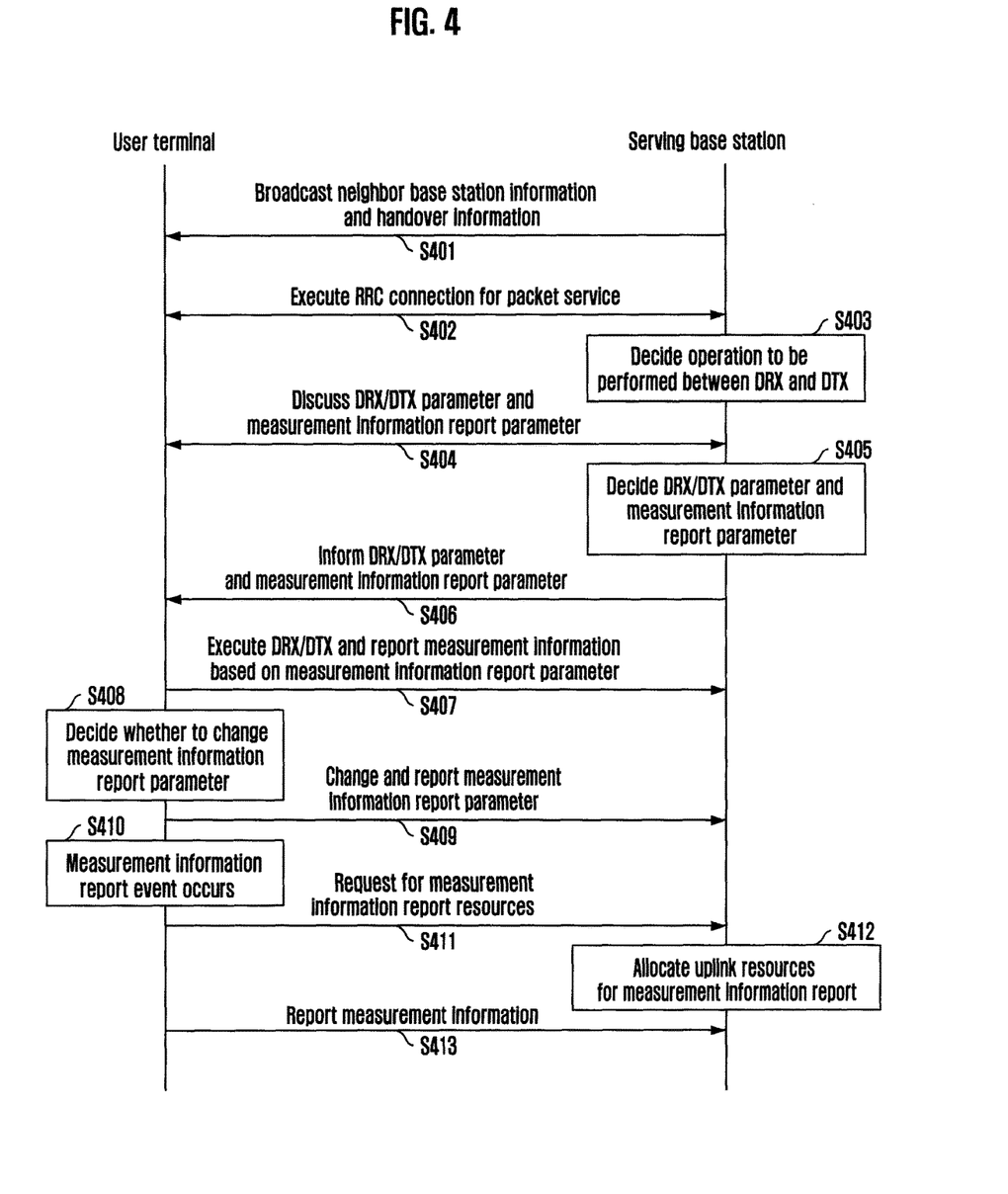
FIG. 4 is a flowchart describing a measurement information reporting method in accordance with an embodiment of the present invention.

FIG. 4 is a flowchart describing a measurement information reporting method to support handover in accordance with an embodiment of the present invention.

In step S401, a terminal receives a handover-related threshold value information carried over system information from a base station before a packet service is initiated. In step S402, the base station and the terminal executes radio resource control (RRC) connection to provide the packet service. The RRC connection between the base station and the terminal may be carried out in a known technology. In the step S401, when a serving base station does not broadcast neighbor cell information, the terminal may request the base station to send the neighbor cell information through an additional control signaling process. Also, the terminal checks neighbor cells with its cell search function, measures the downlink channel quality of the neighbor cells, and reports the measurement information to the serving base station.

If necessary, a DRX/DTX parameter for executing a power-saving operation in an active-state terminal may be set up along with the RRC connection according to quality of service (QoS) and attributions of the packet service. Otherwise, the DRX/DTX parameter may be set up through an additional process after the base station decides the DRX/DTX in the middle of the packet service in step S403. Herein, the base station may discuss the DRX/DTX parameter and the measurement information report parameter with the terminal in step S404 so that the base station can decide related parameters in step S405.

In step S406, the base station informs the terminal of the decided DRX/DTX parameter and the measurement information report parameter. The measurement information report parameter can be set up as the base station transmits an index indicating the type of a measurement information report message to the terminal according to a measurement information report message forming method. In short, the measurement information report parameter can be set up by selecting any one among the types of measurement information report messages shown in the Table 1 in the base station, and informing the terminal of an index corresponding to the selected measurement information report message type.

In step S407, the terminal measures information on the serving cell and neighbor cells at every measurement information report period while executing the DRX/DTX operation based on the parameter set up by the base station, and reports the measured information.

Meanwhile, in step S408, the terminal decides whether to change the measurement information report parameter when a predetermined condition is satisfied, and if necessary, it changes the measurement information report parameter. When the terminal changes the measurement information report parameter without exchanging any control information, it changes the measurement information report parameter and reports the measurement information based on the changed parameter in step S409. Otherwise, when the terminal changes the measurement information report parameter by exchanging control information, the terminal changes the measurement information report parameter through an additional process without the base station, and reports the measurement information based on the changed parameter in the step S409.

Also, in step S410, the terminal executes an event-driven measurement information report when a predetermined condition is satisfied while the terminal executes measurement information report periodically based on the measurement information report parameter. When there are no uplink radio resources for the measurement information report, the terminal stops the DRX/DTX operation and requests the base station for radio resources to be used to report the measurement information in step S411. In steps S412 and S413, when the base station allocates resources for the measurement information report, the terminal executes the event-driven measurement information report by using the allocated resources.

Figure 5:
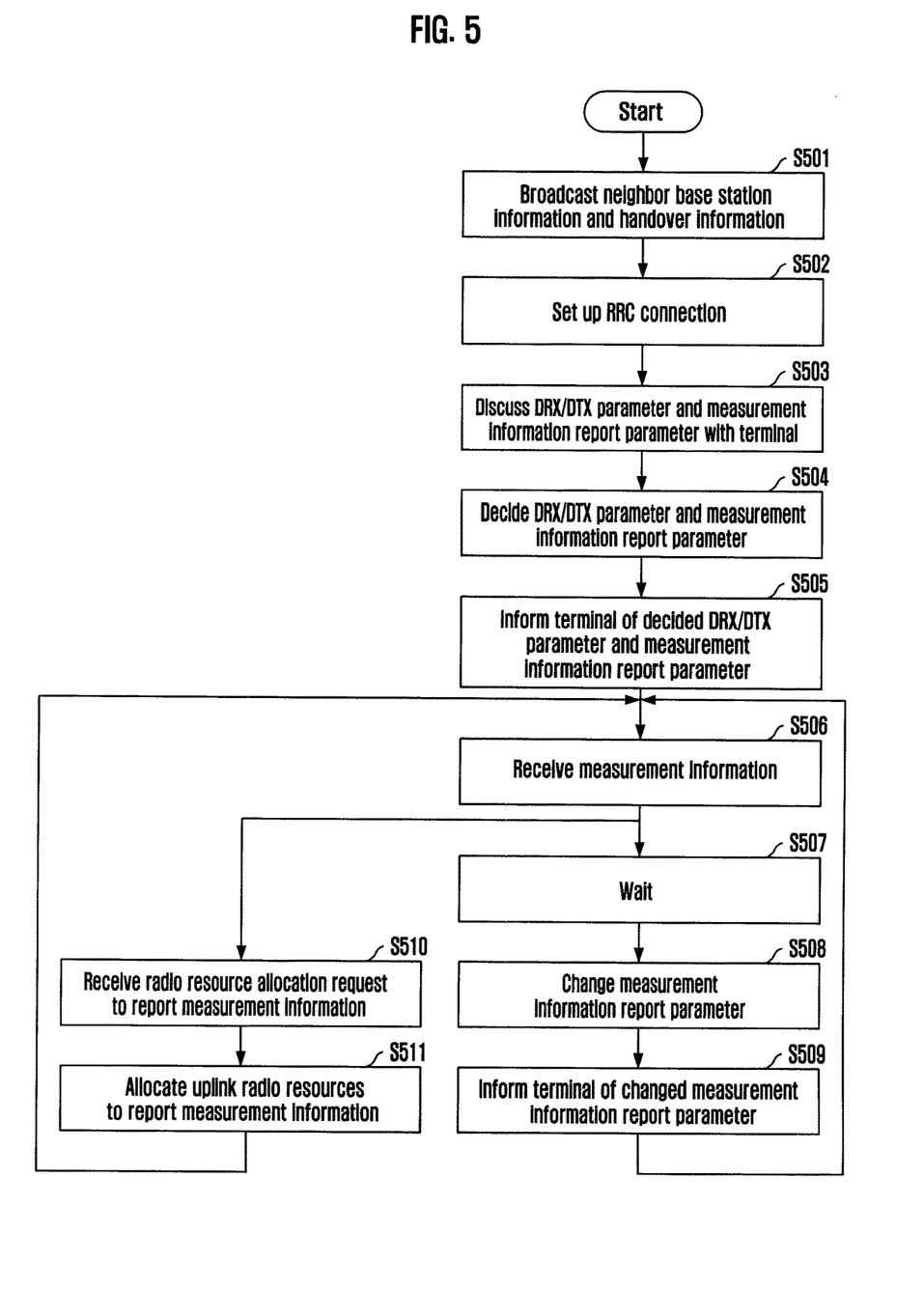
FIG. 5 is a flowchart describing a measurement information reporting method in a base station in accordance with an embodiment of the present invention.

FIG. 5 is a flowchart describing a measurement information reporting method for handover in a base station in accordance with an embodiment of the present invention.

In step S501, a serving base station broadcasts neighbor cell information and handover-related threshold value information through a broadcast channel. Broadcasting the neighbor cell information and handover-related threshold value information through a broadcast channel from the serving base station is optional and the process may be realized in other ways as described above.

In step S502, the serving base station executes radio resource control (RRC) connection with a terminal present in its cell through a typical process. In step S503, the serving base station discusses DRX/DTX periods for power-saving operation and a measurement information report parameter of the serving cell and neighbor cells for the sake of handover with the terminal. In step S504, the base station decides a DRX/DTX parameter and a measurement information report parameter. In step S505, the base station informs the terminal of the decided DRX/DTX parameter and measurement information by using the allocated radio resources.

In step S506, the base station receives the measured information of the serving cell and/or neighbor cells based on the measurement information report parameter transmitted from the terminal. In step S507, the base station transits into a waiting mode and, in steps S508 and S509, the base station exchanges control information with the terminal, changes the measurement information report parameter, and informs the terminal of the changed measurement information report parameter, when the measurement information report parameter needs to be changed based on the measurement information transmitted from the terminal. This process involves changing the measurement information report parameter through exchange of control information. When the measurement information report parameter is changed without exchanging control information, the process of the steps S508 and S509 is omitted.

Meanwhile, when the base station receives a radio resource allocation request for the report of the measurement information from the terminal in step S510, it allocates uplink radio resources for measurement information report in step S511, and transmits the allocated radio resources to the terminal. To sum up, the process where the base station allocates radio resources upon a request from the terminal and informs the terminal of the allocated radio resources may be performed through a typical procedure.

Figure 6:
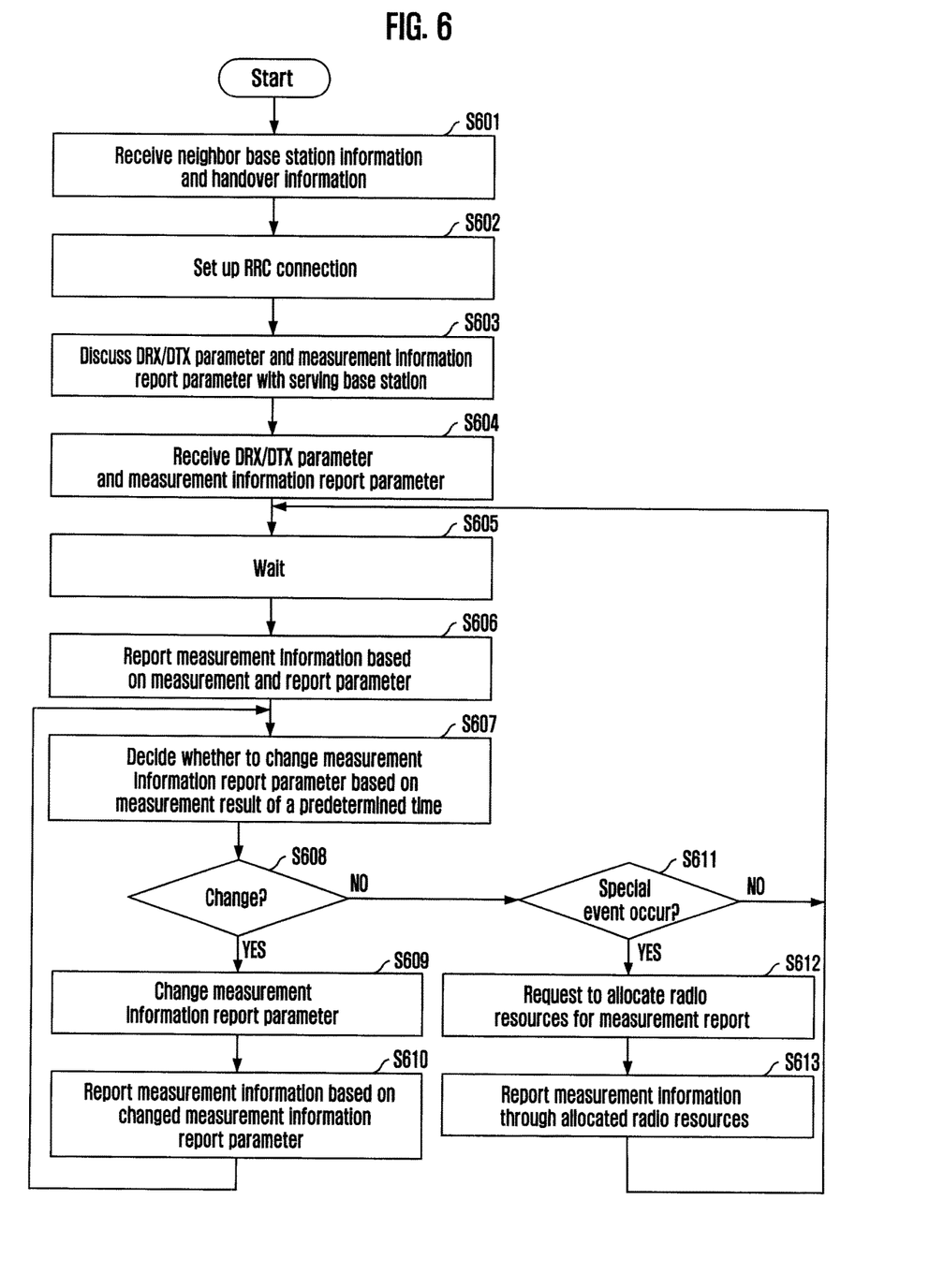
FIG. 6 is a flowchart describing a measurement information reporting method in a terminal in accordance with an embodiment of the present invention.

FIG. 6 is a flowchart describing a measurement information reporting method for handover in a terminal in accordance with an embodiment of the present invention.

In step S601, a terminal receives neighbor cell information and handover-related threshold value information from a serving base station through a broadcast channel. When the serving base station does not broadcast the neighbor cell information and handover-related threshold value information, the terminal may request the serving base station for neighbor cell information and receive it through an additional control signaling process. Also, the terminal may check neighbor cells with its cell search function, measure downlink channel quality of the neighbor cells, and reports the measurement information to the serving base station.

In step S602, the terminal sets up an RRC connection with the serving base station through a predetermined access procedure. Subsequently, the terminal discusses a DRX/DTX parameter for power-saving operation and a measurement information report parameter for handover with the serving base station through the RRC connection in step S603. In step S604, the terminal receives a DRX/DTX parameter and a measurement information report parameter that are decided by the serving base station. Herein, the terminal may set up a measurement information report parameter by receiving an index indicating the type of a measurement information report message from the serving base station according to a measurement information message forming method. According to another method, the terminal may receive a set of available measurement information report parameters from the serving base station.

In step S606, the terminal measures information about the serving base station and the neighbor cells according to a measurement information report period included in the measurement information report parameter and reports the measurement information to the serving base station by using radio resources allocated by the serving base station. In other words, the terminal executing a power-saving operation wakes up at the measurement information report period included in the measurement information report parameter, measures channel qualities of the serving cell and neighbor cells, decodes control signal blocks transmitted from the serving base station at the measurement information report period, checks radio resources information allocated for measurement information report, and reports the measurement information by using allocated radio resources.

In step S607, the terminal decides whether to change the measurement information report parameter based on a measurement result acquired after measurement for a predetermined time period. In other words, the terminal decides whether to change the type of a measurement information report message based on whether a standard deviation of the measurement result acquired after measurement for a predetermined time period falls in or out of a predetermined range. When the terminal needs to change the measurement information report parameter in step S608, the terminal changes the measurement information report parameter by exchanging control information, which is described above, or changes it without exchanging any control information in step S609. In step S610, the terminal reports measurement information based on the changed measurement information report parameter.

Meanwhile, when a specific event occurs in step S611, the terminal requests the serving base station to allocate radio resources for measurement information report in step S612 to report measurement information regardless of the DRX/DTX period. In step S613, the terminal reports the measurement information by using the radio resources allocated by the base station.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention measures and report information about a serving base station and neighbor base stations based on a measurement information report parameter, which is set up by the serving base station, to support active-state terminals executing a power-saving operation to perform handover in a packet-based communication system.

What is claimed is:

1. A communication method, comprising:
receiving a first message indicating a discontinuous reception (DRX) period;
receiving a second message comprising a first value for a measurement information report parameter;
periodically performing measurement report operations based on a predetermined time period to transmit a plurality of measurement results, each of the measurement report operations comprising:
measuring channel condition according to the first value to generate a measurement result;
generating a periodic measurement report message based on the measurement result; and
transmitting the periodic measurement report message based on the predetermined time period; and
receiving a third message comprising a second value for the measurement information report parameter, wherein the second value is determined at least based on a standard deviation of the plurality of measurement results, wherein the predetermined time period is equal to N times of the DRX period and N is a positive integer larger than one (1).

2. The method of claim 1, wherein the measurement information report parameter includes at least one of the predetermined time period, an identity of at least one target base station, and a subject to be measured including radio channel condition.

3. The method of claim 2, wherein the at least one target base station includes a serving base station and a neighbor base station.

4. The method of claim 1, wherein the measurement information report parameter indicates a predetermined event.

5. The method of claim 1, further comprising:
while periodically performing the measurement report operations:
determining that a predetermined event has occurred;
in response to an occurrence of the predetermined event, transmitting a fourth message requesting allocation of radio resources, and
in response to the occurrence of the predetermined event, transmitting an aperiodic measurement report message using the allocated radio resources,
wherein the aperiodic measurement report message is related to the predetermined event and the aperiodic measurement report message is transmitted in addition to periodically transmitting the periodic measurement report messages.

6. The communication method of claim 5, wherein the aperiodic measurement report message is transmitted even before the predetermined time period has passed.

7. A communication method, comprising:
generating a first message indicating a discontinuous reception (DRX) period;
transmitting the first message indicating the DRX period;
generating a second message comprising a first value for a measurement information report parameter;
transmitting the second message comprising the first value for the measurement information report parameter;
periodically performing measurement report reception operations based on a predetermined time period to receive a plurality of measurement results, wherein each of the plurality of measurement results indicates a measured channel condition;
determining a second value for the measurement information report parameter at least based on a standard deviation of the plurality of measurement results;
generating a third message comprising the second value for the measurement information report parameter; and
transmitting the third message, wherein the predetermined time period is equal to N times of the DRX period and N is a positive integer larger than one (1).

8. The method of claim 7, wherein the measurement information report parameter includes at least one of the predetermined time period, an identity of at least one target base station to receive the measurement report, and a subject to be measured including radio channel condition.

9. The method of claim 8, wherein the at least one target base station includes a serving base station and a neighbor base station.

10. The method of claim 7, wherein the measurement information report parameter indicates a predetermined event.

11. An apparatus, comprising:
a memory; and
a processor operably coupled to the memory,
wherein the processor, when executing program instructions stored in the memory, is configured to:
cause the apparatus to receive a first message indicating a discontinuous reception (DRX) period;
cause the apparatus to receive a second message comprising a first value for a measurement information report parameter;
periodically performing measurement report operations based on a predetermined time period to transmit a plurality of measurement results, each of the measurement report operations comprising:
measuring channel condition according to the first value to generate a measurement result;
generating a periodic measurement report message based on the measurement result; and
transmitting the periodic measurement report message based on the predetermined time period; and
cause the apparatus to receive a third message comprising a second value for the measurement information report parameter, wherein the second value is determined at least based on a standard deviation of the plurality of measurement results, wherein the predetermined time period is equal to N times of the DRX period and N is a positive integer larger than one (1).

12. The apparatus of claim 11, wherein the measurement information report parameter includes at least one of the predetermined time period, an identity of at least one target base station, and a subject to be measured including radio channel condition.

13. The apparatus of claim 12, wherein the at least one target base station includes a serving base station and a neighbor base station.

14. The apparatus of claim 11, wherein the measurement information report parameter indicates a predetermined event.

15. The apparatus of claim 11, wherein the memory further stores instructions that, when executed by the processor, causes the apparatus to:
while periodically performing the measurement report operations:
determine that a predetermined event has occurred;
in response to an occurrence of the predetermined event, cause the apparatus to transmit a fourth message requesting allocation of radio resources, and in response to the occurrence of the predetermined event, cause the apparatus to transmit an aperiodic measurement report message using the allocated radio resources,
wherein the aperiodic measurement report message is related to the predetermined event and the aperiodic measurement report message is transmitted in addition to periodically transmitting the periodic measurement report messages.

16. The apparatus of claim 15, wherein the aperiodic measurement report message is transmitted even before the predetermined time period has passed.

17. A communication device, comprising:
a processor; and
a memory operably coupled to the processor,
wherein the processor, when executing program instructions stored in the memory, is configured to:
generate a first message indicating a discontinuous reception (DRX) period; cause the device to transmit the first message indicating the DRX period; generate a second message comprising a first value for a measurement information report parameter;
cause the device to transmit the second message comprising the first value for the measurement information report parameter;
cause the device to periodically perform measurement report reception operations based on a predetermined time period to receive a plurality of measurement results, wherein each of the plurality of measurement results indicates a measured channel condition;
determine a second value for the measurement information report parameter at least based on a standard deviation of the plurality of measurement results;
generate a third message comprising the second value for the measurement information report parameter; and
cause the device to transmit the third message, wherein the predetermined time period is equal to N times of the DRX period and N is a positive integer larger than one (1).

18. The communication device of claim 17, wherein the measurement information report parameter includes at least one of the predetermined time period, an identity of at least one target base station to receive the measurement report, and a subject to be measured including radio channel condition.

19. The communication device of claim 18, wherein the at least one target base station includes a serving base station and a neighbor base station.

20. The communication device of claim 17, wherein the measurement information report parameter indicates a predetermined event.

* * * * *